United States Patent [19]

Porter et al.

[11] 3,860,098

[45] Jan. 14, 1975

[54] HYDRAULIC LOCKING DEVICE
[75] Inventors: Percy L. Porter; Clyde R. Porter, both of Los Angeles, Calif.
[73] Assignee: P. L. Porter Co., Los Angeles, Calif.
[22] Filed: Dec. 22, 1971
[21] Appl. No.: 211,074

Related U.S. Application Data
[63] Continuation-in-part of Ser. No. 846,782, Aug. 1, 1969, abandoned.

[52] U.S. Cl............ 188/300, 188/315, 248/354 H, 297/355
[51] Int. Cl............................................ F16d 63/00
[58] Field of Search .......... 188/300, 312, 314, 315; 248/354 H; 297/355

[56] References Cited
UNITED STATES PATENTS
3,051,274  8/1962  Porter................................ 188/300

FOREIGN PATENTS OR APPLICATIONS
1,244,012  9/1960  France.............................. 188/315
647,193  10/1962  Italy.................................. 188/314

*Primary Examiner*—George E. A. Halvosa
*Attorney, Agent, or Firm*—George F. Smyth

[57] ABSTRACT

A piston on a piston rod devides a cylinder into two hydraulic locking chambers, fluid flow between the two chambers being through the piston under control of a locking valve. A rotary adjustment sleeve of stepped configuration permits adjustment of the piston stroke. A reservoir for hydraulic fluid adjoins one locking chamber so that leakage from the chamber is into the reservoir. The reservoir is cut off when the piston moves out of its normal limit position.

4 Claims, 5 Drawing Figures

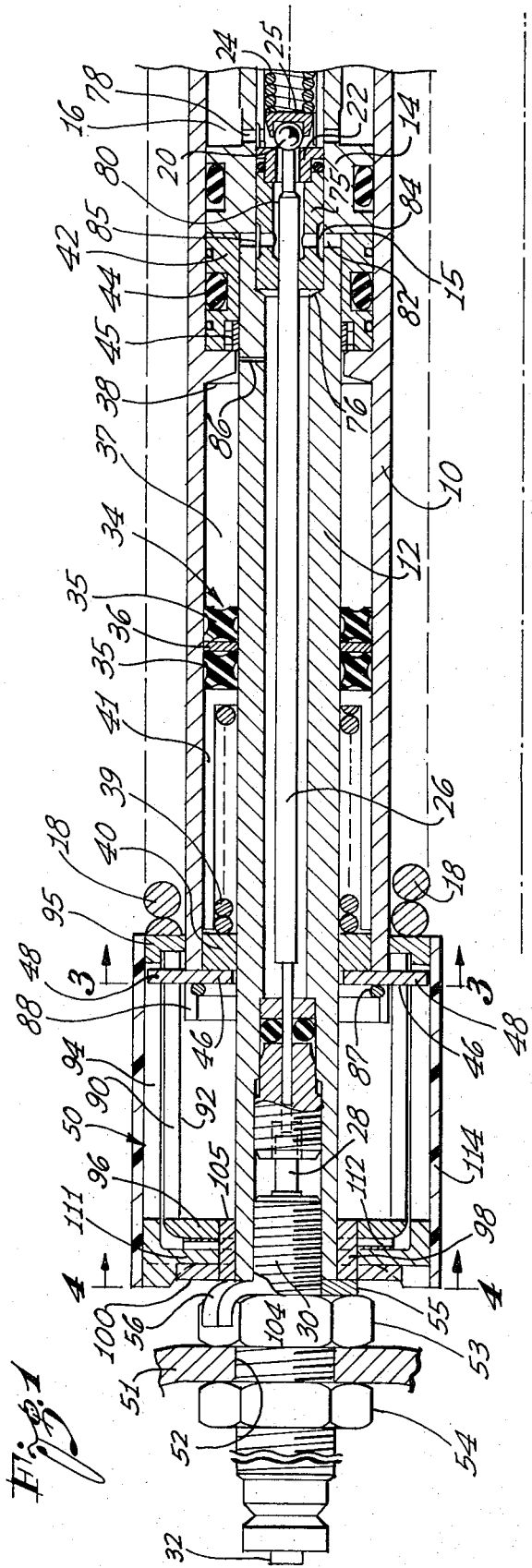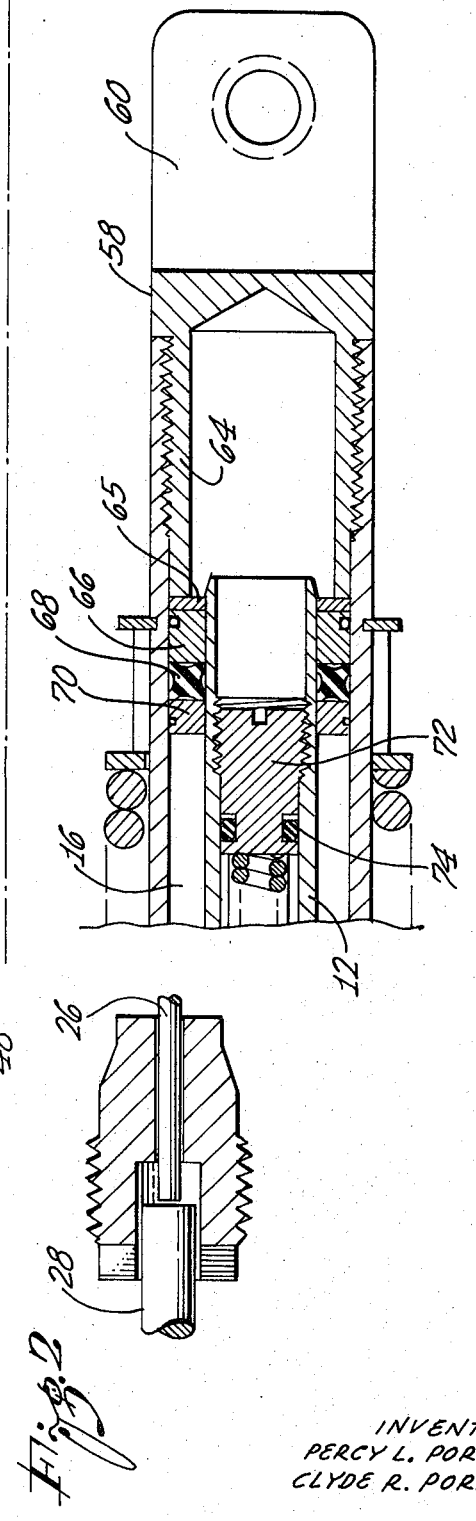

PATENTED JAN 14 1975 3,860,098

INVENTORS:
PERCY L. PORTER
CLYDE R. PORTER

By Smyth, Roston & Pavitt
ATTORNEYS

HYDRAULIC LOCKING DEVICE

CROSS-REFERENCES TO RELATED APPLICATIONS

The invention relates to a longitudinally extensible tion Ser. No. 846,782 filed Aug. 1, 1969 entitled "HYDRAULIC LOCKING DEVICE, " now abandoned.

BACKGROUND OF THE INVENTION

This invention relates to a longitudinally extensible and contractable hydraulic locking device to control the spacing between two members. While the invention is widely applicable for its purpose, it has special utility for controlling the tiltable back rest of a reclining seat in aircraft and other vehicles. Such an embodiment of the invention has been selected for the present disclosure and will provide adequate guidance for those skilled in the art who may have occasion to apply the same principles to other specific purposes.

Devices of this type are disclosed in the Porter U.S. Pat. No. 3,051,274 and the Porter et al. U.S. Pat. No. 2,559,047. These prior disclosures are hereby incorporated into the present disclosure by reference. The application of such a hydraulic locking device to the control of a tiltable back rest of a reclining chair is set forth in the Armstrong U.S. Pat. No. 2,522,246.

A hydraulic locking device of this type comprises a cylinder confining a quantity of hydraulic fluid and a piston dividing the cylinder into two hydraulic locking chambers, the piston being unitary with a tubular piston rod which extends through both ends of the cylinder. What may be termed a locking valve controls communication between the two locking chambers and is normally closed to immobilize the piston. A heavy external coil spring functions in compression between the cylinder and the piston rod to oppose contraction of the hydraulic locking device, i.e., to oppose the backward tilt of the back rest of the seat. Thus the heavy spring serves to counterbalance the back rest.

One problem to which the invention is directed relates to the fluid reservoir which is held under pressure by a spring with one end of the reservoir sealed by a gland. When the seat back is inclined rearward from its normal forward upright position and is adjusted forwardly to various angles, the resulting fluctuating fluid pressure commonly causes the gland to "dashpot" or cycle. The reservoir gland is depressed in opposition to the reservoir spring to result in the creation of a void on the opposite side of the piston with consequent backlash.

Another problem to which the invention is directed relates to the fact that the length of time that the hydraulic locking device can operate without being serviced depends on the length of time the device can operate without replenishment of the fluid in the reservoir. Heretofore a normal expected service period has been from 3 to 7 years whereas the service life of the average passenger airplane is 10 to 15 years. The problem is to make the service life of the hydraulic locking device comparable to the service life of the airplane on which it is installed. The economic importance of this problem may be appreciated when it is considered that the labor for removing a hydraulic locking device from an airplane seat is on the order 16.00 to 24.00 dollars and when the locking device is removed, the labor cost of servicing the device is on the order of 8.00 to 15.00 dollars.

A third problem to which the invention is directed is to provide quick and convenient adjustment of the locking device for various lengths of piston stroke and to provide a wide choice in the length of the piston stroke to make the locking device adaptable to various installation requirements.

SUMMARY OF THE INVENTION

The first problem of eliminating dashpot action and the resulting backlash is solved by providing a construction for the hydraulic lock that automatically isolates the spring-pressed fluid of the reservoir from the locking chambers whenever the back rest of the seat is tilted rearwardly, i.e., whenever the piston of the hydraulic lock moves out of its normal limit position. The invention takes advantage of the fact that in a locking device of this type the piston rod is tubular and a portion of the tubular piston rod serves as a wall of the fluid reservoir. The solution to the problem is to employ a radial port in the piston rod for flow between the reservoir and the locking chambers and to cut off this port whenever the piston rod shifts to move the piston out of its normal limit position. For this purpose a fixed seal embraces the piston rod and the radial port in the piston rod moves away from the reservoir past the fixed seal whenever the tubular piston rod shifts the piston out of its normal limit position.

The second problem of increasing the period of time that the hydraulic locking device may operate without servicing is solved in part by increasing the capacity of the reservoir and in part by reducing the number of paths of leakage of the hydraulic fluid to the exterior of the device. To increase the capacity of the reservoir, the location of the reservoir is changed from internally of the tubular piston rod to the more ample annular space around the tubular piston rod. This change in location increases the reservoir capacity by more than four fold.

To reduce leakage to the exterior of the device, the annular reservoir is positioned adjacent one end of one of the two locking chambers with an annular seal embracing the piston rod between the reservoir and the locking chamber. By this arrangement the inevitable leakage from the end of the adjacent locking chamber is into the fluid reservoir instead of to the exterior of the device.

The third problem of quick and easy adjustment of the length of the piston stroke with a wide range of choice in the length of the stroke is accomplished by providing a rotatable stop sleeve of stepped configuration for cooperation with a fixed stop. A fixed index means releasably engages the rotatable stop sleeve selectively at a number of rotary positions of the stop sleeve. To change the rotary position of the stop sleeve it is slightly retracted axially out of engagement with the fixed stop in opposition to the pressure of a biasing spring. The retracted stop sleeve is manually rotated to a new position for a different length of piston stroke and is then released for reengagement with the fixed index means.

The features and advantages of the invention may be understood from the following detailed description and the accompanying drawings.

BRIEF DESCRIPTION OF THE DRAWINGS

In the drawings, which are to be regarded as merely illustrative:

FIG. 1 which is shown in two parts, is a longitudinal sectional view of the presently preferred embodiment of the invention;

FIG. 2 is an enlargement of a portion of FIG. 1 showing an adjustable bushing;

DESCRIPTION OF THE PREFERRED EMBODIMENT OF THE INVENTION

Figure 3:
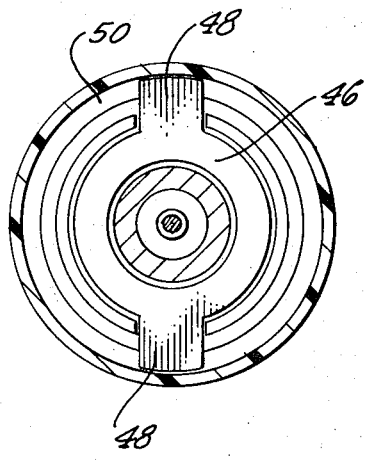
FIG. 3 is a transverse section taken along the line 3 — 3 of FIG. 1.

The principal parts of the invention of the embodiment shown in the drawings include: a cylinder 10; a tubular piston rod 12; a piston 14 integral with the piston rod and dividing the interior of the cylinder into two annular locking chambers 15 and 16 (in FIG. 1 the piston 14 is retracted to a limit position that reduces the capacity of the locking chamber 15 to substantially zero); a heavy external counterbalancing coil spring 18 in compression between the cylinder and the piston rod to exert counterbalancing force; a locking valve in the form of a ball 20 cooperating with a valve seat in the form of an axial bushing 22 in the piston; a coil spring 24 acting on a cage 25 to urge the ball towards its closed position; a first operating rod or push rod 26 inside the tubular piston rod 12 to unseat the ball 20; a second operating rod 28 slidingly mounted in a screw-threaded extension 30 of the tubular piston rod and abutting the first operating rod, an end portion 32 of the second operating rod being exposed to receive actuating force for unseating the ball 20; an annular gland structure, generally designated 34, in the form of a pair of sealing rings 35 and an intervening spacer ring 36; a reservoir 37 for hydraulic fluid closed at one end by the gland structure 34 and closed at the other end by an annular assembly comprising an inner radial flange 38 of the cylinder 10; a spring 39 in compression between a bearing 40 and a flanged spacer sleeve 41 to keep the gland under pressure and thereby pressurize the hydraulic fluid in the reservoir 37; an annular gland 42 for the piston rod, the gland having an outer circumferential sealing ring 44 and an inner circumferential "slipper" sealing means 45; and stop means comprising a disk 46 having two diametrically opposite stop fingers 48 cooperative with a stop sleeve 50 of stepped configuration that is rotatably adjustable for selectively limiting the length of the stroke of the piston 14.

At one end of the device the tubular piston rod 12 is suitably adjustably connected to a fixed portion 51 of the airplane seat structure and for this purpose, the threaded piston rod extension 30 extends through a bore 52 of the fixed structure. The threaded extension 30 of the piston rod is formed with an integral nut 53 which abuts one side of the fixed portion 51 and cooperates with a second nut 54 which is threaded onto the piston rod extension 30 in abutment with the opposite side of the fixed portion 51.

The threaded extension 30 of the tubular piston rod is locked against rotation relative to the piston rod by a lock washer 55 that is interlocked with the piston rod by a tongue (not shown) of the lock washer seating in a notch (not shown) in the front end of the tubular piston rod. The lock washer 55 is formed with a plurality of pliable locking fingers which may be bent selectively into engagement with a peripheral face of the nut 53. The selected bent finger is indicated at 56 in FIG. 1.

At the other end of the device a fitting 58 is provided for connecting the cylinder 10 to the swingable backrest (not shown) of the seat, the fitting 58 having a clevis portion 60 for operative connection to the backrest. The fitting 58 is formed with a cylindrical skirt 64 that threads into the end of the cylinder 10 to back up an annular assembly that has the dual purpose of closing the outer end of the second locking chamber 15 and of serving as a guide for the tubular piston rod 12. This annular assembly comprises a ring 65 that backs against the end of the cylindrical skirt 64, an annular bearing 66, a sealing ring 68 and a spacer ring 70.

The inner end of the tubular piston rod 12 is closed by a screw 72 that is embraced by a sealing ring 74 and backs up one end of the previously mentioned valve spring 24.

The inner end of the operating rod 26 is guidingly supported by a bushing 75 that backs against an inner circumferential shoulder 76 of the tubular piston rod. To provide fluid communication between the two locking chambers 15 and 16 under control of the ball 20, the tubular piston rod 12 is formed with radial ports 78 on the far side of the piston 14 to communicate with the locking chamber 16. A small chamber 80 is formed around the inner end of the operating rod 26 by the bushings 22 and 75 and as the bore of the bushing 75 contains no sealing element, fluid may bleed through the slight annular clearance between the rod and the defining wall of the bore of the bushing 75; radial bores 82 in the bushing 75 communicate with an outer circumferential groove 84 of bushing 75; and the groove 84 registers with radial ports 85 on the inner side of the piston for communication with the locking chamber 15. To permit communication between the reservoir 37 and the two locking chambers 15 and 16 when the piston 14 is at its normal limit position shown in FIG. 1, the tubular piston rod 12 is provided with a radial bleeder port 86 which is normally positioned leftward from the sealed bearing 42.

The previously mentioned stop disk 46 which backs against the bushing 40 and is under pressure from the spring 39 is secured by a wire snap ring 87 that seats in an inner circumferential groove of the cylinder 10. The stop disk 46 is locked against rotation relative to cylinder 10 because the two diametrically opposite stop fingers of the stop disk extend through two corresponding slots 88 in the end of the cylinder.

Radially ourwardly of the cylinder 10, the two diametrically opposite stop fingers 48 extend through corresponding slots 90 of a spacer sleeve 92 and radially outwardly from the spacer sleeve the stop fingers extend into the diametrically opposite openings 94 in the previously mentioned stop sleeve 50.

The previously mentioned counterbalance spring 18 presses against a flanged washer 95 which abuts the inner end of the spacer sleeve 92. The spacer sleeve 92 has a forward annular end wall 96 that interlocks with a collar 98 that embraces the piston rod 12. The collar 98 in turn interlocks with an index disk 100 that abuts the previously mentioned lock washer 55.

Figure 4:
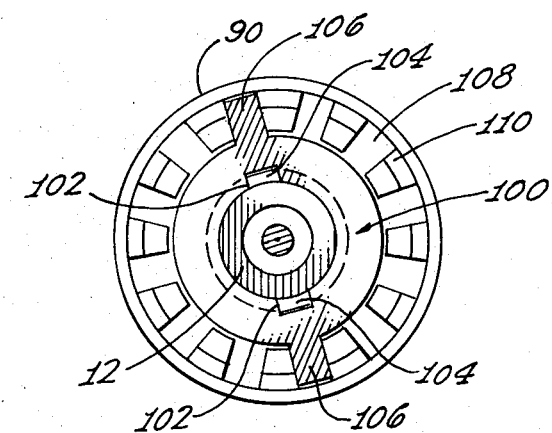
FIG. 4 is a transverse sectional view taken along the line 4 — 4 of FIG. 1.

As indicated in FIG. 4, the index disk 100 has two diametrically opposite inner circumferential notches 102 and the outer end of the collar 98 is formed with corresponding tongues 104 that seat in the notches. In like manner the inner end of the collar 98 has a corresponding pair of tongues 105 (FIG. 1) which engages corresponding inner circumferential notches in the end wall 96 of the spacer sleeve 92. Thus the pressure from the counterbalance spring 18 is transmitted to the piston rod 12 by elements 92, 96, 98 100 and 56 and this arrangement interlocks the index disk 100 against rotation relative to the piston rod 12.

The index disk 100 has two diametrically opposite index fingers 106 which seat selectively in radial notches 108 that are formed by radial teeth 110 on the outer face of an annular end wall 111 of the stop sleeve 50. The stop sleeve 50 is rotatable relative to the cylinder 10 through a substantial number of degrees because the diametrically opposite stepped openings 94 of the stop sleeve are substantially wider in circumferential dimension than the stop fingers 106 that extend into the openings.

Since the annular end wall 111 of the stop sleeve 50 slidingly embraces the collar 98, the stop sleeve is axially movable between a normal forward position and a rearward release position. At the normal forward position the end wall 111 of the stop sleeve abuts the index disk 100 with a pair of radial diametrically notches 108 of the stop sleeve engaging the diametrically opposite index fingers 106 of the index disk 100. At the rearward release position of the stop sleeve 50 the radial teeth 110 of the stop sleeve are retracted from the index fingers 106 to permit rotation of the stop sleeve relative to the hydraulic cylinder 10. An annular marcel spring 112 is interposed under axial compression between the annular end wall 111 of the stop sleeve and the annular end wall 96 of the spacer sleeve 92 to yieldingly maintain the stop sleeve in releasable engagement with the index fingers 100.

Figure 5:
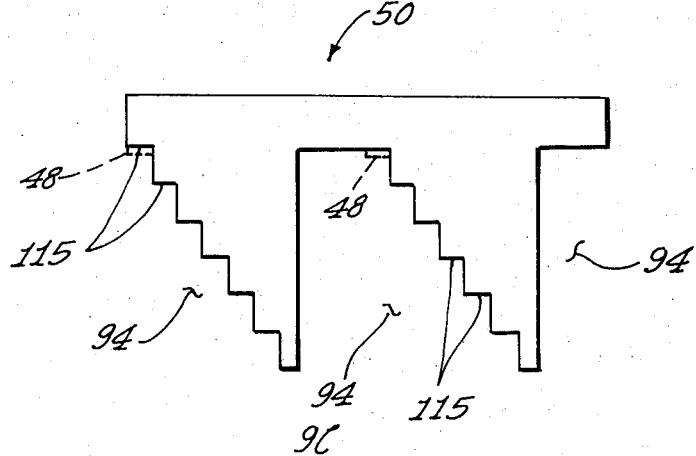
FIG. 5 is a developed view of a stop sleeve for variable adjustment of the length of the piston stroke.

In this particular embodiment of the invention each of the two diametrical openings 94 in the stop sleeve 50 has six steps 115 to cooperate with the corresponding stop finger 106 and the index teeth of the stop sleeve form six pairs of diametrically opposite notches 108 to seat the pairs of index fingers 106 selectively. A suitable transparent plastic sleeve 114 encloses the locking sleeve 50 and is fixedly bonded thereto. The transparent sleeve serves the purpose of keeping foreign matter from entering the stepped openings 94 of the locking sleeve and also serves the purpose of making the stop fingers 48 and the steps 115 (FIG. 5) of the stop sleeve visible to indicate at a glance which step limits the stroke of the piston.

The manner in which the described hydraulic locking device serves its purpose may be readily understood from the foregoing description. With the piston 14 in its left limit position shown in FIG. 1, the swingable backrest of the airplane seat being in its forward upright position, the locking chamber 15 is completely contracted. At this time the reservoir is in communication with the locking chamber 15, the path of communication including: the radial bleeder port 86; the interior of the tubular piston rod 12; the annular path formed by unsealed clearance around the operating rod 26 and the bore of the bushing 75; and the radial port 85 through the wall of the tubular piston rod into the locking chamber 15. The locking chamber 16 is fully expanded and fluid communication between the two locking chambers is cut off by the ball 20 seated against the bushing 22 under the pressure of the valve spring 24. To permit the backrest of the seat to be swung rearward, the occupant of the seat manipulates a control for manual retraction of the second operating rod 32 which first causes the operating rod 26 to unseat the valve ball 20. The piston is then free to shift rightwardly as long as the ball 20 is unseated and hydraulic fluid flows between the two locking chambers through the piston in accord with the axial movements of the piston. When the two operating rods 26, 32 are released the ball 20 reseats to lock the piston 14 at whatever position it may be placed.

To change the stroke of the piston and thus adapt the hydraulic locking device for a particular range of movement of a backrest of a particular airplane seat, the stop sleeve 50 is manually retracted against the opposition of the marcel spring 112 to free the stop sleeve from the index fingers 106. Then with the stop sleeve 50 and a stop finger 48 under observation through the transparent sleeve 114, the stop sleeve is rotated to a desired new position for changing the length of the piston stroke.

As heretofore emphasized, the placing of the reservoir 37 in the relatively large annular space surrounding the piston rod provides a reservoir of at least four times the capacity of the reservoirs shown in the prior Porter patents. It is also to be noted that since the sealed bearing 42 is interposed between the reservoir 37 and the first locking chamber 15, any leakage from the left end of the locking chamber 15 past the sealing assembly is into the reservoir 37 instead of to the exterior of the device. Thus, the invention eliminates loss of hydraulic fluid by leakage to the atmosphere from one of the locking chambers, the reduced leakage and the ample capacity of the reservoir 37 making it unnecessary to replenish the hydraulic fluid during the normal life of an airplane.

It is important to note that the bleeder port 86 of the reservoir 37 is normally located to the left of the sealed bearing 42. At this time fluid may flow from the reservoir 37 into locking chamber 15 and if the fluid pressure on the left side of the ball is sufficient to unseat the ball, fluid from the reservoir may also bleed into the second locking chamber 16. Unseating of the ball 20 by the operating rod 26 while the bleeder port 86 is in the position shown in FIG. 1 will also permit fluid from the reservoir to flow into the second locking chamber 16. An important fact is that as soon as the piston 14 is shifted rightward out of its normal leftward position, the bleeder port 86 of the reservoir moves leftward past the sealed bearing 42 and is thereby cut off from the reservoir. Thus when the piston is moved rightward to an extend out of its normal position, the spring-pressed reservoir 37 is cut off from the two locking chambers to prevent the heretofore mentioned cycling of the reservoir gland structure 34 with consequent back lash of the piston.

Our description in specific detail of the presently preferred embodiment of the invention will suggest various changes, substitutions and other departures from our disclosure within the spirit and scope of the invention.

We claim:

1. In a locking device of the character described to control relative movement between two members, comprising a hydraulic cylinder connected to one of the two members, a tubular piston rod extending through at least one end of said cylinder and connected to the other of the two members, a piston united with the piston rod, the piston dividing the interior of the cylinder into two locking chambers, and a locking valve controlling fluid flow between the two chambers to control the freedom of movement of the piston, the improvement comprising:

a reservoir for hydraulic fluid to replenish the fluid in the two chambers, a portion of said tubular piston rod forming a wall of the reservoir, said reservoir having a movable wall;

means including a radial port in said portion of the tubular piston rod to permit flow of hydraulic fluid from the reservoir to one of said two locking chambers when the piston is at one of its two opposite limit positions, spring means acting against said movable wall of the reservoir to place the fluid in the reservoir under pressure for effecting flow to one of said locking chambers; and sealing means embracing the tubular piston rod adjacent one end of the reservoir, said radial port being positioned along the length of the tubular piston rod to move out of communication with the reservoir into the region of said sealing means and past the sealing means when the piston moves out of one of its limit positions towards its other limit position whereby the reservoir is cut off from both of said locking chambers whenever the piston moves out of said limit position.

2. An improvement as set forth in claim 1 in which said sealing means separates one end of the reservoir from one end of said one of the two locking chambers whereby leakage from said one end of said locking chamber is into the reservoir.

3. An improvement as set forth in claim 1 in which said piston has a single normally closed valve located on its axis to control fluid flow between the two locking chambers and which includes an operating rod extending through the tubular piston rod to open said valve.

4. An improvement as set forth in claim 1 in which said piston rod extends through both ends of the hydraulic cylinder so that normally the total amount of fluid in the two locking chambers is constant throughout the range of movement of the piston.

* * * * *